United States Patent [19]
Ayer et al.

[11] 3,909,145
[45] Sept. 30, 1975

[54] PANEL GRID MODULE CONSTRUCTION SYSTEM

[75] Inventors: Francois N. Ayer, Watertown; Richard B. Cotter, Dorchester; Richard E. Chambers, Canton, all of Mass.

[73] Assignee: The United States of America as represented by the Secretary of the Air Force, Washington, D.C.

[22] Filed: Mar. 28, 1974

[21] Appl. No.: 455,690

[52] U.S. Cl. .................................. 404/40; 404/43
[51] Int. Cl.² ....................... E01C 5/00; E01C 3/00
[58] Field of Search ............................ 404/43, 40

[56] References Cited
UNITED STATES PATENTS

| | | |
|---|---|---|
| 3,065,506 | 11/1962 | Tramer .......................... 404/43 |
| 3,096,695 | 7/1963 | Reinhardt ........................ 404/43 |
| 3,367,693 | 2/1968 | Weltman .......................... 404/40 |
| 3,504,472 | 4/1970 | Clement .......................... 404/43 |

Primary Examiner—Mervin Stein
Assistant Examiner—Steven Hawkins
Attorney, Agent, or Firm—Joseph E. Rusz; Henry S. Miller

[57] ABSTRACT

A panel grid module construction system designed to be rapidly emplaced over subgrades for load bearing purposes including an interlocking grid-beam network, and panels adapted to be dropped into the grid network where they are locked and sealed into position.

1 Claim, 3 Drawing Figures

PANEL GRID MODULE CONSTRUCTION SYSTEM

BACKGROUND OF THE INVENTION

This invention relates generally to portable load bearing surfaces and more specifically to surfaces that may be rapidly constructed over large areas and withstand large shock forces and heavy loads.

The prior art contains substantial documentation concerning man's efforts to overcome the adverse effects of nature and its many deleterious elements that effect his progress of searching into the unknown and unexplored. In the past vast areas of the earth's surface that were neither sea nor land were largely ignored because of the dangers and expense of penetrating into these areas. Two common regions exhibiting these characteristics are jungle and desert. More recently however man has found that with the use of helicopters and airplanes these risks can be largely avoided and hence a great deal of interest has developed in exploring these regions.

Because of limited range and limited carrying capacity, the helicopter must be supplemented by the cargo aircraft for hauling basic supplies long distances. One of the obstacles that immediately surfaces is the difficulty in providing a landing field in a remote area. Existing techniques have a forward party move ahead by helicopter with light equipment, clear an area then establish a temporary field until aircraft could bring in a portable landing strip. Hopefully after construction, the aircraft could take off again.

Prior art portable landing fields were manufactured in large steel sections that prevented their practical movement by helicopter. Further, known construction systems have a tendency to settle at their junction points and hence on soft or sandy terrain soon become bumpy or rutted. In some cases the sections broke loose upon sharp impact as when a heavily loaded aircraft makes a hard landing. Additionally, some known systems involve a rigid interlocking whereby a number of panels must be removed to repair a single damaged panel.

These disadvantages of the prior art are overcome with the instant invention. A totally new concept of a simple, strong, flexible and lightweight panel-grid module construction system has been developed which is setforth hereinafter and forms the basis of our invention.

SUMMARY OF THE INVENTION

The invention consists of a structural grid-beam network having strong lightweight panels that are dropped into position and locked securely in place. The grid-beam network may be fabricated from aluminum or other light weight metals and manufactured to any appropriate length to fit a suitable means for transporting them to a site. The beam has a pair of hinged edge pieces that move down grasping the edge of a panel and is locked in place by a spline bar. The panels are individually removable by merely removing four splined bars.

The grid-beams are longitudinally inter connected by a mating male-female shear connector while tranverse connections are made by a specially designed hub.

The panels have a basic sandwich structure cross-section consisting of epoxy-fiberglass skins bonded directly to an aluminum honeycomb core. Each panel has an edge of resilient material that forms a seal when the panel is locked into position.

The invention, while primarily considered for utilization in the horizontal plane as a load bearing surface, is also suitable for use in the vertical plane as for example in constructing walls for an aircraft hanger, with additional panels forming the roof of the structure.

It is therefore an object of the invention to provide a new and improved construction system for portable load bearing surfaces.

It is another object of the invention to provide a new and improved portable construction system that is light weight and easily transported.

It is a further object of the invention to provide a portable construction system that strong and easily assembled.

It is still another object of the invention to provide a new and improved portable construction system that allows repair of damaged components with relative ease.

It is still a further object of the invention to provide a new and improved portable construction system that is adapted to be utilized in the vertical as well as the horizontal plane.

It is another object of the invention to provide a new and improved portable construction system that locks and seals surface panels in place.

It is another object of the invention to provide a new and improved portable construction system that resists structural disruptions at mating joints.

It is another object of the invention to provide a new and improved panel-grid module construction system which is economical to produce and utilizes conventional, currently available components that lend themselves to standard mass production manufacturing techniques.

These and other advantages, features and objects of the invention will become more apparent from the following description taken in connection with the illustrative embodiment in the accompanying drawings.

DESCRIPTION OF THE PREFERRED EMBODIMENTS

Figure 1:
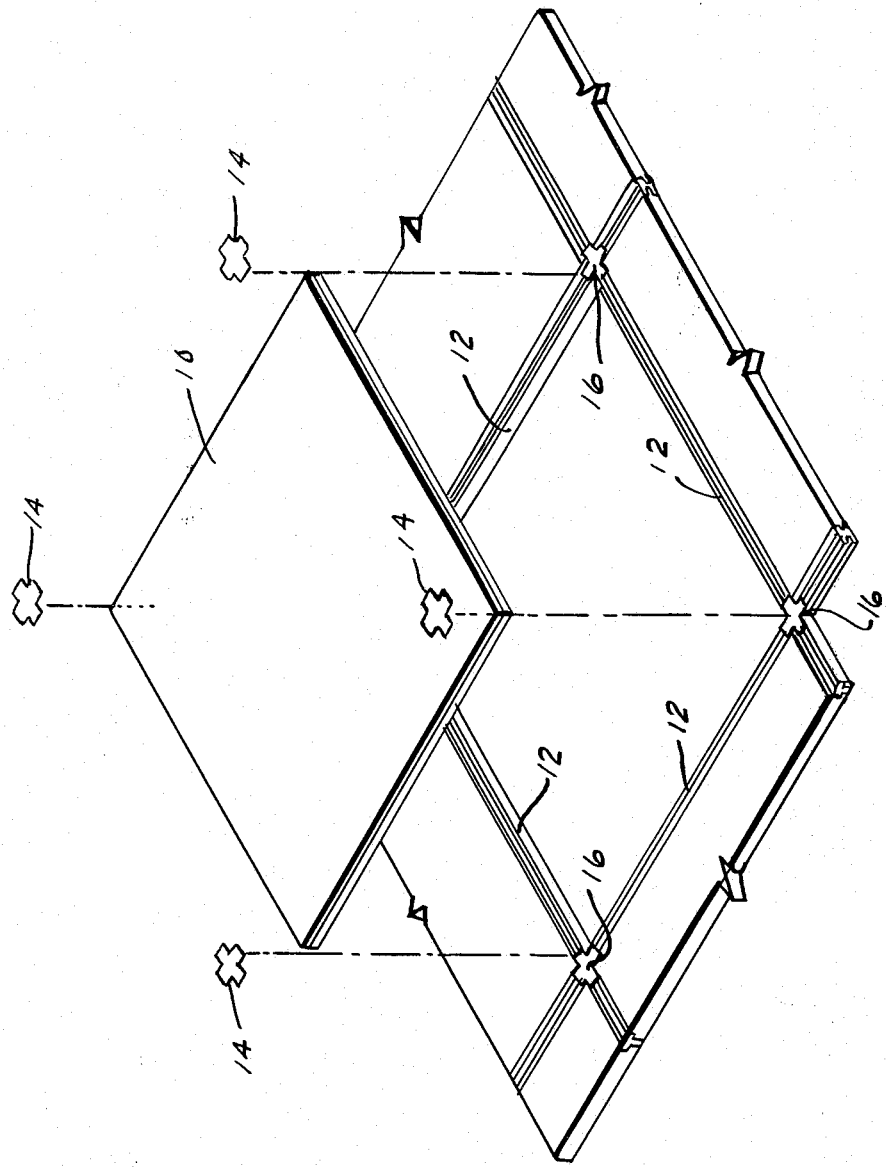
FIG. 1 is a perspective representation of the general arrangement of the panel-grid module system.

Referring now to FIG. 1 a single square panel is shown at 10. This panel is lowered into the grid-beam network 12 and is locked in, as will be shown hereinafter. The hub cover plates 14 are placed on top of the hub 16 at each of the corners of the panel insert, thus providing a smooth surface at the intersection of transverse grid-beam members. The overall dimensions of the system are unlimited and the system may extend as far as desired in either direction.

Figure 2:
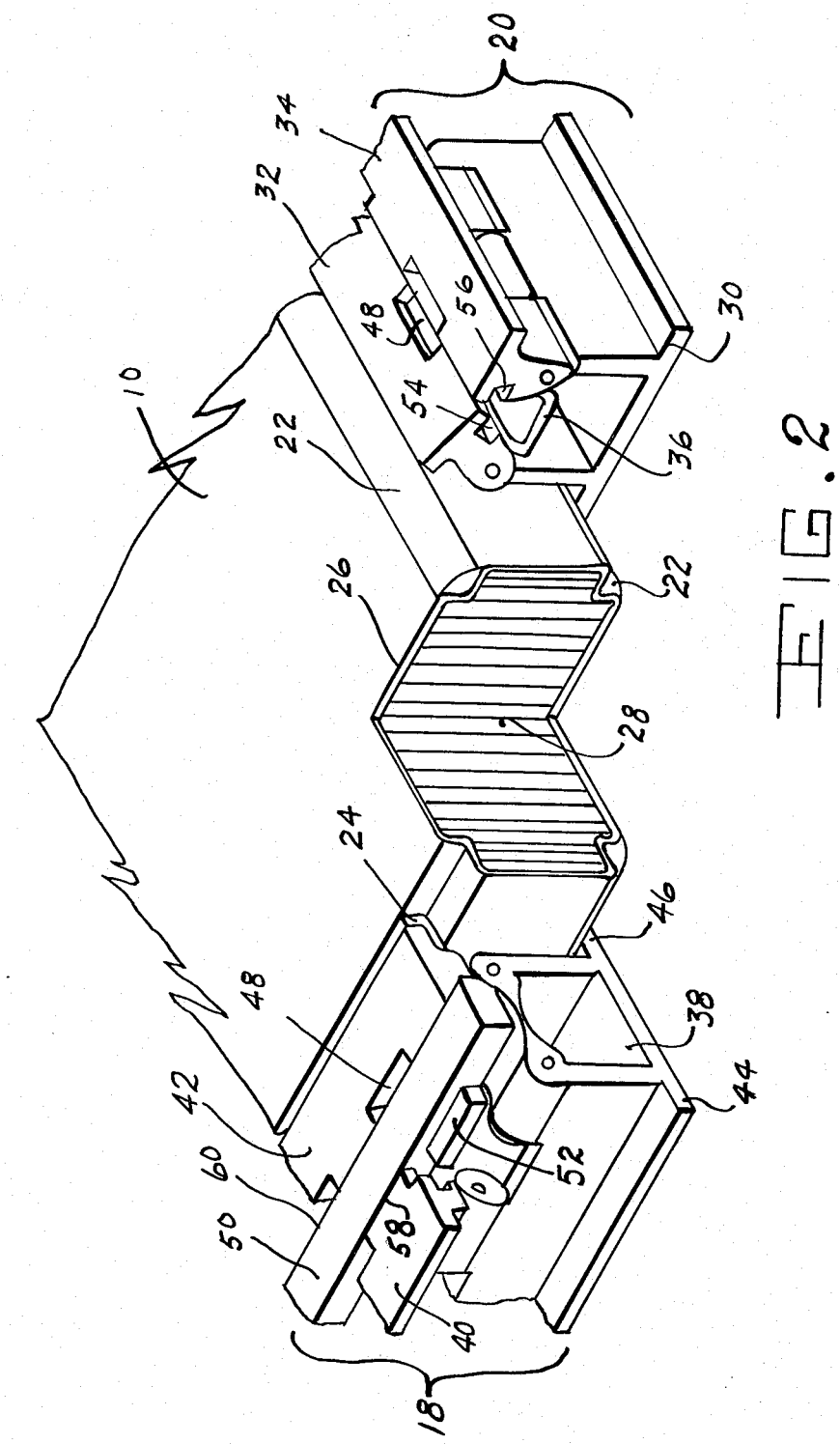
FIG. 2 is a perspective view of a panel locked into the grid-beam network.

FIG. 2 shows a panel 10 locked in place at 18 and inserted but unlocked at 20. The panel is provided with a resilient seal 22 along each edge and is shown compressed in the locked position at 24. The panel has a sandwich structure with an epoxy-fiberglass skin 26 bonded directly to the aluminum honeycomb core 28.

In an alternative embodiment an aluminum skin may be utilized to replace the epoxy-fiberglass described.

The grid-beam 20 consists of a base 30 having mounted thereon a pair of hinged flange members 32, 34. The flanges swing upwardly to allow the panel to be inserted into the grid. A beam seal 36 further completes the sealing of the system.

Grid-beam 18 is shown in the locked position with a base 38 and the flanges 40, 42 in the horizontal position, parallel to the base flanges 44, 46. The flange 42 is shown locking the panel 10 in place while compressing the resilient seal 24. Each flange is provided with a series of recesses 48, a locking spline 50 is placed between the flanges thereby locking them in position. Projections 52 extending from the spline mate with and pass through the recesses, allowing the spline to drop into the channel formed by the closed flanges as is best seen in beam 20 at 54 and 56. Once in position the spline is moved longitudinally the length of the projection and the spline is thereby secured by the edge 58, 60 of the flange, against accidental removal.

Figure 3:
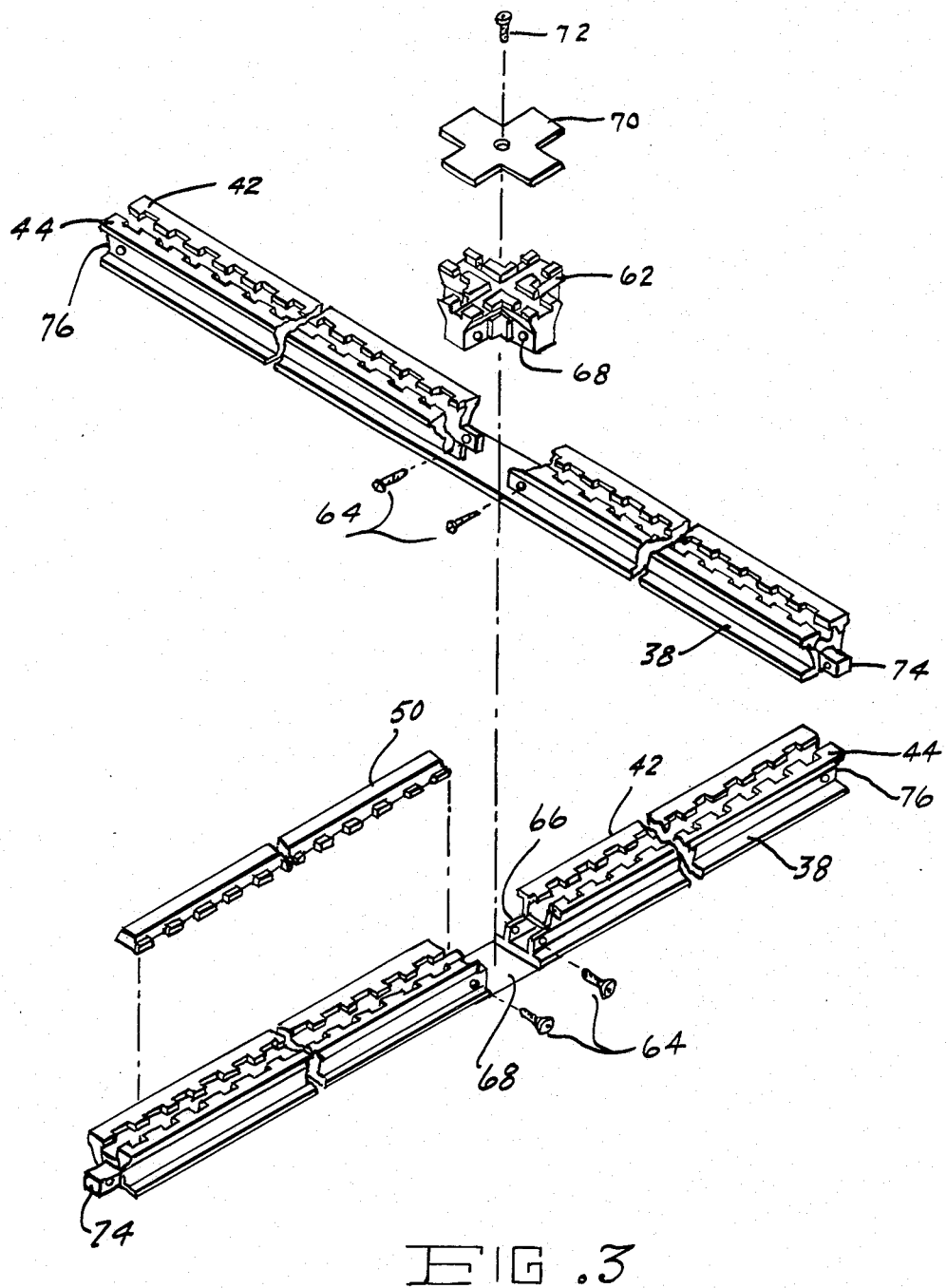
FIG. 3 is a detailed representation of the grid-beam utilized in the system.

In FIG. 3 there is shown the grid-beam in greater detail. The base 38 with hinged flanges 42 and 44 and the locking spline 50. At the nodes of the grid are hub structures 62 which are connected to the grid beams by bolts 64 passing through the holes 66 and 68.

Each hub is provided with its own compatable base plate 68. The hub is covered with a hub cover plate 70, designed to provide a smooth contiguous surface, and secured by the threaded screw 72. In operation removal of the cover plate allows access to the spline wherein the projections may be moved into or out of alignment with the recesses for securing or removing the spline. The ends of the beam are alternately male 74 and female 76 shear connectors which are secured by a convention threaded bolt.

Having thus described our invention for a panel grid module construction system we make the following claims of invention.

We claim:

1. A panel grid module construction system comprising: a panel having a top, a bottom and sides joining the top and bottom along each edge and having an aluminum honeycomb filler core, recessed means along each edge of the top and bottom, and a resilient seal means mounted in the recessed means; a plurality of interlocking grid beams extending in a first direction, each of said grid beams including a base, a pair of spaced parallel walls mounted on the base, a pair of flanges, each hingedly attached to one of said walls and having a plurality of recesses medially positioned along one edge thereof, a locking spline means having a plurality of projections so positioned to mate with said recesses and adapted to be positioned between each parallel flange, and a beam seal means between said parallel walls and abutting said flanges; a plurality of interlocking grid beams extending in a second direction transverse to said first direction, and mating means adapted to interconnect said beams extending in the said first direction to said beams extending in said second direction.

* * * * *